No. 11,884. Reissued Jan. 15, 1901.
F. W. ZINGSEM.
CARBONATING MACHINE.
(Application filed Nov. 27, 1900.)
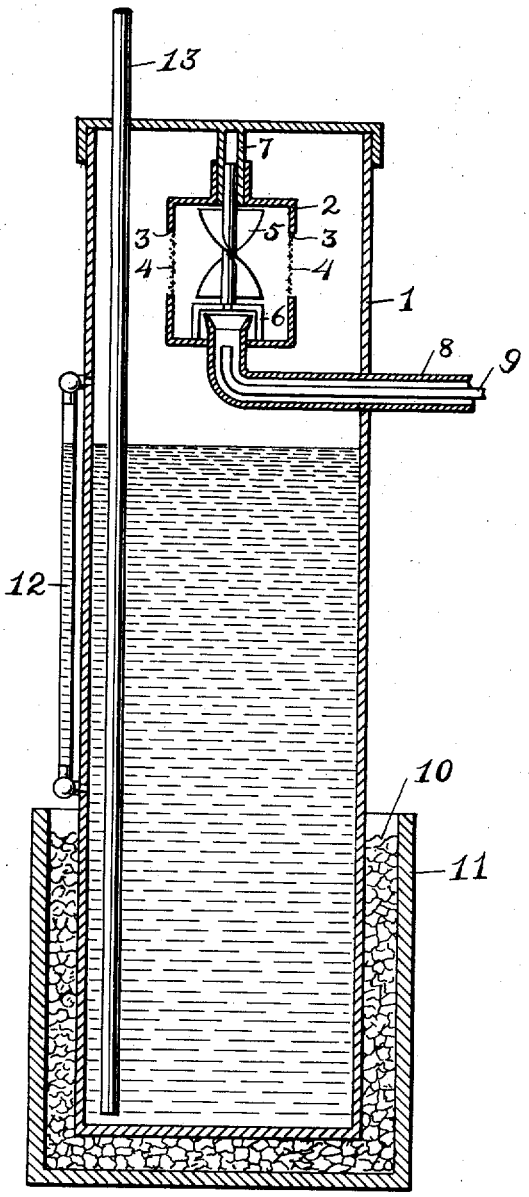
WITNESSES:
Roy M. McClintock
James K. McClintock
INVENTOR
Frederick W. Zingsem.
BY
Frank McClintock.
ATTORNEY.

UNITED STATES PATENT OFFICE.

FREDERICK W. ZINGSEM, OF NEW YORK, N. Y., ASSIGNOR OF ONE-HALF TO WILLIAM F. LEWIS, OF SAME PLACE.

CARBONATING-MACHINE.

SPECIFICATION forming part of Reissued Letters Patent No. 11,884, dated January 15, 1901.

Original No. 626,126, dated May 30, 1899. Application for reissue filed November 27, 1900. Serial No. 37,893.

*To all whom it may concern:*

Be it known that I, FREDERICK W. ZINGSEM, of the city of New York, borough of Brooklyn, in the county of Kings and State of New York, have invented a new and Improved Carbonating-Machine, of which the following is a full, clear, and exact description.

This invention relates to improvements in machines for carbonating liquids, such as water; and the object is to provide a simple and comparatively inexpensive device for this purpose by means of which the gas and liquid will be thoroughly mixed in a very short time.

I will describe a carbonating-machine embodying my invention, and then point out the novel features in the appended claims.

Reference is to be had to the accompanying drawing, forming a part of this specification, in which the figure is a vertical section of a carbonating-machine embodying my invention.

The carbonating-machine comprises a cylinder 1, arranged in the upper portion of which is a casing 2, which forms a mixing-chamber for the gas and liquid. At two opposite sides this casing has openings 3, and in each opening a screen 4, of comparatively fine mesh, is arranged. The casing 2 is closed on its other two sides and at its top and bottom. It is shown as suspended from the upper wall of the cylinder 1.

Mounted to rotate on a vertical axis in the casing 2 is a beater in the form of a screw or propeller 5. The lower end of the shaft of this beater has a step-bearing in a yoke 6, secured to the bottom wall of the casing, and the upper portion of said shaft has a bearing in a tube 7, extended from the top wall of the cylinder to which the casing is attached. Leading from a suitable water-supply is a pipe 8, which extends through the wall of the cylinder and also through the bottom of the casing 2, and within the casing it is provided with a flaring mouth which is in line with the beater 5, and arranged within the pipe 8 is a gas-supply tube 9, the inner end of which terminates a short distance below the outlet of the water-pipe 8.

In operation the liquid under pressure will run through the pipe 8, and at the same time the gas will flow through the pipe 9 and discharge in the form of a small jet into the water before said water discharges from its pipe. This relative arrangement of the water-supply pipe and the gas-supply tube is an essential feature of the invention, since the water and gas are thereby already well mixed mechanically when discharged into the cylinder. The discharged water and gas will strike against the propeller-like beater 5 and cause it to rapidly rotate. This rotating motion of the beater will cause an intimate mixing of the gas and water within the casing and throw it forcibly outward against the screens 4, and in passing through these screens the globules will be finely broken up, so that the water will very quickly absorb gas to its full capacity.

It is found that more gas will be absorbed by the water when the water is kept at a low temperature. Therefore to aid in the carbonating of the water whenever the temperature is too high to secure good results I employ a freezing mixture 10, which surrounds the lower portion of the cylinder 1. This freezing mixture is here shown as placed in a tank 11, which is about one-third the height of the cylinder 1. A water-gage 12 is placed on the cylinder, and a discharge-pipe 13 leads from near the bottom of the cylinder through its top.

Having thus described my invention, I claim as new and desire to secure by Letters Patent—

1. In a carbonating-machine, the combination with a cylinder, of a casing suspended in the cylinder, openings in the sides of said casing, screens of fine mesh in said openings, a propeller-like beater in the casing, a water-supply pipe extending into the cylinder and up through the bottom of the casing, and a gas-supply tube within the water-pipe and having its discharge end a short distance below the outlet of said water-pipe, substantially as specified.

2. A carbonating-machine, comprising a cylinder, a casing suspended in the cylinder, the said casing being closed at opposite sides, and having openings in its other opposite sides, screens of fine mesh in said openings, a propeller-like beater in the casing and mounted to rotate on a vertical axis, a water-supply pipe extended through the bottom of the casing and adapted to discharge water against the lower end of the beater to rotate the same, and a gas-supply tube having its discharge end within a short distance below the outlet of the water-pipe, substantially as specified.

3. A carbonating-machine, comprising a cylinder, a casing suspended in the cylinder, the said casing being closed at opposite sides, and having openings in its other opposite sides, screens of fine mesh in said openings, a propeller-like beater in the casing and mounted to rotate on a vertical axis, a water-supply pipe, extended through the bottom of the casing and adapted to discharge water against the lower end of the beater to rotate same, a gas-supply tube having its discharge end within and a short distance below the outlet of the water-pipe and a tank for a cooling mixture in which the cylinder is placed.

FREDERICK W. ZINGSEM.

Witnesses:
WILLIAM A. BLAEDEL, Jr.,
WM. W. TURNER.